Patented Sept. 13, 1938

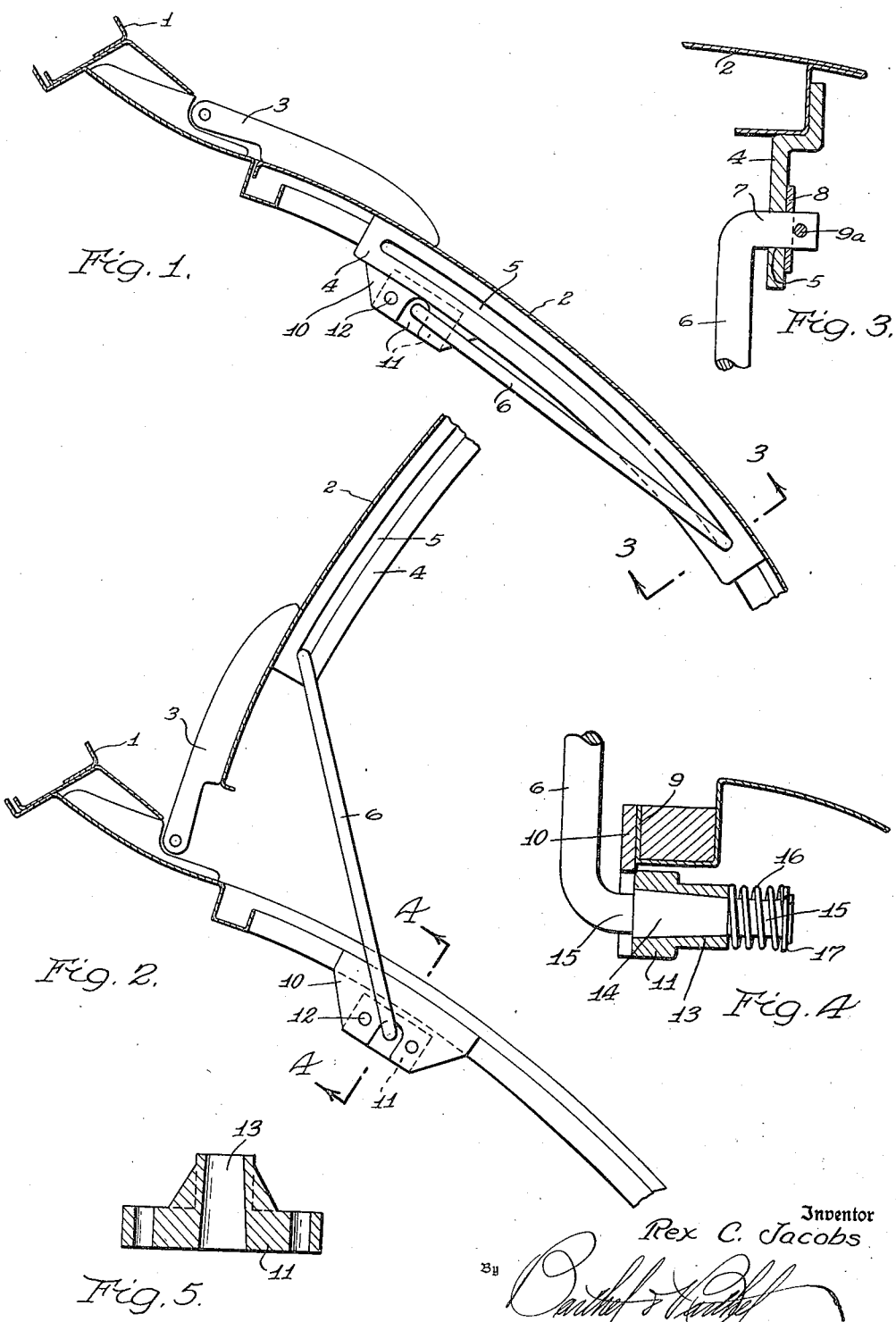

2,130,185

UNITED STATES PATENT OFFICE 2,130,185

DECK LID PROP

Rex C. Jacobs, Detroit, Mich.

Application August 28, 1937, Serial No. 161,395

3 Claims. (Cl. 217—60)

The present invention relates to a prop designed particularly for supporting the hingedly mounted rear deck lid of an automobile in an open position.

The primary object of the invention is to provide a prop having means supporting one end thereof whereby it may swing about said end, and means connecting the swinging end, slidably, with the hingedly mounted rear deck lid of an automobile whereby swinging movement of the prop takes place incident to opening and closing movement of the lid. Associated with the prop pivot is a friction creating means which, when the lid is open, exerts sufficient friction against movement of the prop whereby the latter holds the lid open.

In a prop of the character above referred to it is essential that the friction creating means be so constructed that it will continue to function even in the presence of wear. Accordingly, it is another object of the invention to provide friction creating means embodying a tapered head and a tapered socket receiving and rotatably supporting said head, resilient means being provided which urges the head into the socket to induce friction through contact, under pressure, of the tapered head with the socket wall.

With the above and other ends in view the invention is more fully disclosed with reference to the accompanying drawing, in which Figure 1 is a fragmental vertical section of an automobile, illustrating the rear deck lid closed;

Fig. 2 is a similar view, illustrating the deck lid open;

Fig. 3 is a section taken on the line 3—3 of Fig. 1;

Fig. 4 is a section taken on the line 4—4 of Fig. 2, and

Fig. 5 is a section of a detail.

Like characters of reference are employed throughout to designate corresponding parts.

The numeral 1 designates a fragment of an automobile having a rear deck lid 2 connected thereto by a hinge 3. Secured beneath the lid 2 is a rigid element 4 having a guide slot 5 therein and a prop 6 has one end bent at 7 and extending through the slot. A washer 8 is held on the end 7 by a pin 9a to retain it within the slot.

Secured to a reinforced part 9 of the automobile body is a plate 10 upon which a bracket 11 is mounted. The plate 10 is preferably welded to the body part 9 and the bracket is secured to the plate by bolts or rivets 12. The bracket 11 has a tapered socket 13 receiving a tapered head 14 formed on the bent portion 15 of the prop.

It becomes apparent, therefore, that the prop comprises a metal rod having its two ends bent perpendicular to the main portion thereof, one end being retained in a slot in a member carried by the lid, and the other end having a tapered head received in a tapered socket in a bracket mounted upon a stationary part of the automobile body. When the deck lid 2 is closed, as shown in Fig. 1, the prop end 7 resides at the extreme right hand end of the slot 5, as the device is shown in the drawing. As the lid 2 is manually moved from the position shown in Fig. 1 to that shown in Fig. 2 the prop swings about the axis of the head 14, due to engagement of the end 7 with the wall of the slot 5, until the end 7 resides at the extreme left hand end of the slot 5. In this latter position, the prop assumes an angle approximately 15° from a vertical plane, and in the absence of a holding means, will not support the lid. Accordingly, the invention provides means for holding the prop in the angular position shown in Fig. 2 against the gravitational force tending to close the lid.

Rotation of the head 14 in the socket 13 is frictionally resisted due to the action of a spring which is compressed between a retainer on the end 13 and the adjacent wall of the bracket 11. The spring draws the head 14 into the socket and by wedging the same therein induces sufficient friction to overcome the gravitational forces acting on the open lid. It has been found that an ordinary rear deck lid may be held open, substantially at the angle shown in the drawing, by disposing and proportioning the parts whereby the prop assumes an angle approximately 15° when the lid is fully opened, using a taper of approximately three-quarters of an inch per foot, and a comparatively light spring 16.

The invention has been shown and described as comprising a single unit, but it is contemplated that two units such as here shown will be used on a single lid in some cases. An arrangement of two units is not here shown because it is believed to be obvious to those skilled in the art that the device shown and described may be duplicated by placing a unit at each of the two sides of the lid 2.

Although a specific embodiment of the invention has been illustrated and described it will be understood that various changes may be made within the scope of the appended claims without departing from the spirit of the invention, and such changes are contemplated.

What I claim is:

1. In combination with an automobile body having a hingedly mounted lid, a prop for holding said lid open, said prop comprising a bracket mounted on a stationary portion of the body adjacent said lid, said bracket having a tapered socket therein, an arm, a tapered head in said socket supporting said arm for swinging movement thereabout, a member carried by said lid and having a guide slot therein, means on the swinging end of said arm slidably received in said guide slot whereby opening and closing movement of said lid causes swinging movement of said arm, and spring means urging said tapered head into said socket to induce friction opposing swinging movement of said arm.

2. In combination with an automobile body having a hingedly mounted lid, a prop for holding said lid open, said prop comprising a bracket mounted on a stationary portion of the body adjacent said lid, said bracket having a tapered socket therein, an arm having an angularly bent end, a tapered head integral with said end, said head being rotatably received in said socket and supporting said arm for swinging movement thereabout, a member carried by said lid and having a guide slot therein, means on the swinging end of said arm slidably received in said guide slot whereby opening and closing movement of said lid causes swinging movement of said arm, and spring means urging said tapered head into said socket to induce friction opposing swinging movement of said arm.

3. A device of the character described comprising a guide member adapted to be mounted on a movable member, a bracket adapted to be attached to a stationary member, an arm having its ends bent angularly to the main portion thereof, one of said bent ends slidably engaging said guide member, said bracket having a tapered socket, the other bent end having a tapered head received in said socket, and means maintaining the head in frictional contact with the socket.

REX C. JACOBS.